United States Patent [19]

Bagdan et al.

[11] 4,212,617
[45] Jul. 15, 1980

[54] APPARATUS FOR PRODUCING A FLOW OF SHORT CHEESE STRANDS

[75] Inventors: Henry J. Bagdan, Rutherford, N.J.; William A. Blain, Spring Valley, N.Y.

[73] Assignee: Nabisco, Inc., East Hanover, N.J.

[21] Appl. No.: 34,581

[22] Filed: Apr. 30, 1979

[51] Int. Cl.² .................... A01J 27/00; A01J 25/15
[52] U.S. Cl. ........................... 425/311; 264/142; 425/310
[58] Field of Search ............... 264/142; 425/308, 310, 425/311, 315, 313

[56] References Cited

U.S. PATENT DOCUMENTS

| | | | |
|---|---|---|---|
| 3,341,892 | 9/1967 | Mayner | 425/313 |
| 3,624,830 | 11/1971 | Stehower | 425/313 |
| 3,711,296 | 1/1973 | Lawarre | 425/313 |
| 4,145,453 | 3/1979 | Lenhardt | 264/142 |

Primary Examiner—James H. Derrington
Attorney, Agent, or Firm—Gerald Durstewitz; Paul E. O'Donnell

[57] ABSTRACT

Continuously extruded strands of cheese are case hardened by a flow of air directed against the strands as they emerge from the die openings. The strands are periodically cut at the face of the die plate to form short strand pieces. The cutting blade moves within the air flow and the air impinging upon the strand pieces move the pieces away from the blade as they are cut.

9 Claims, 8 Drawing Figures

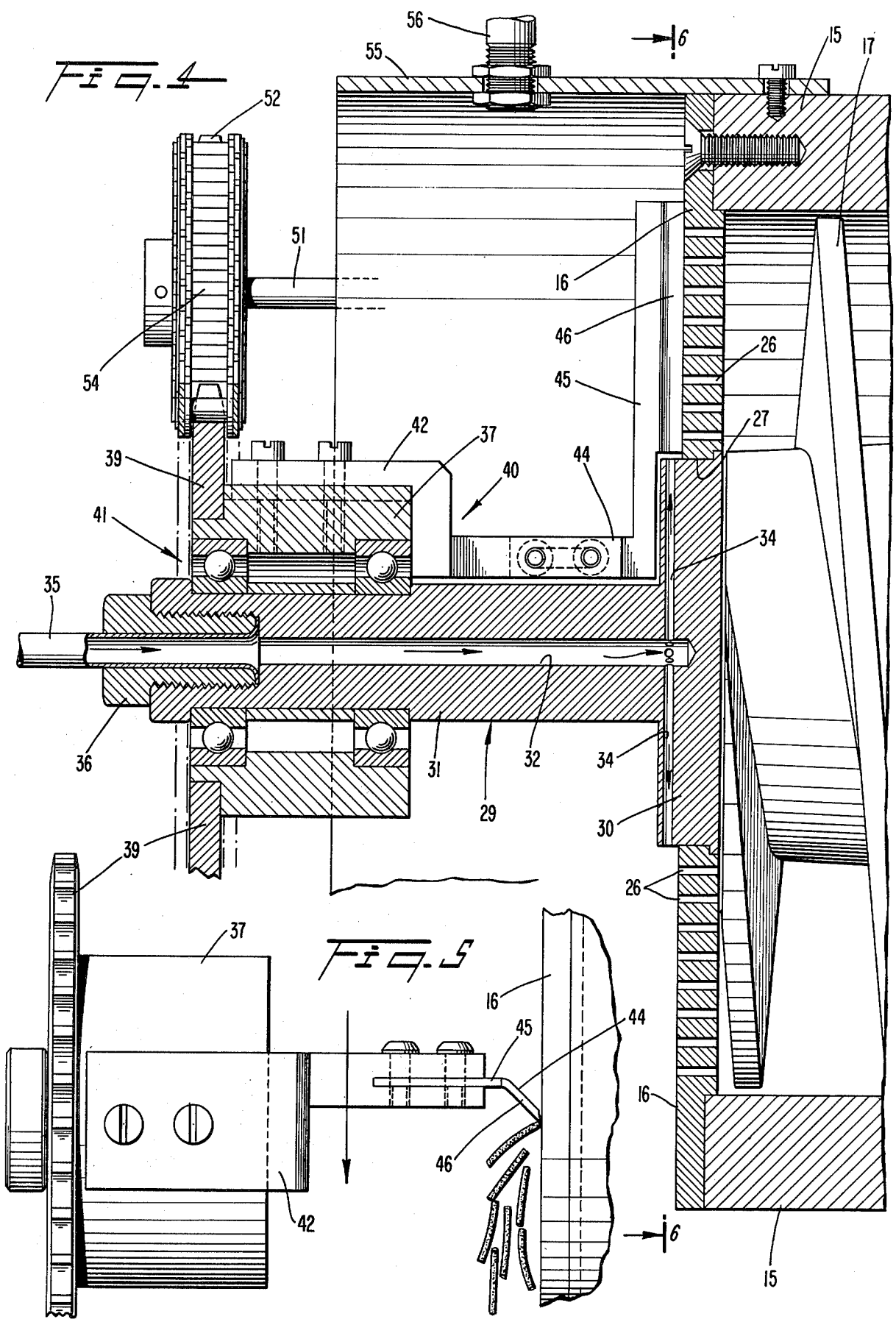

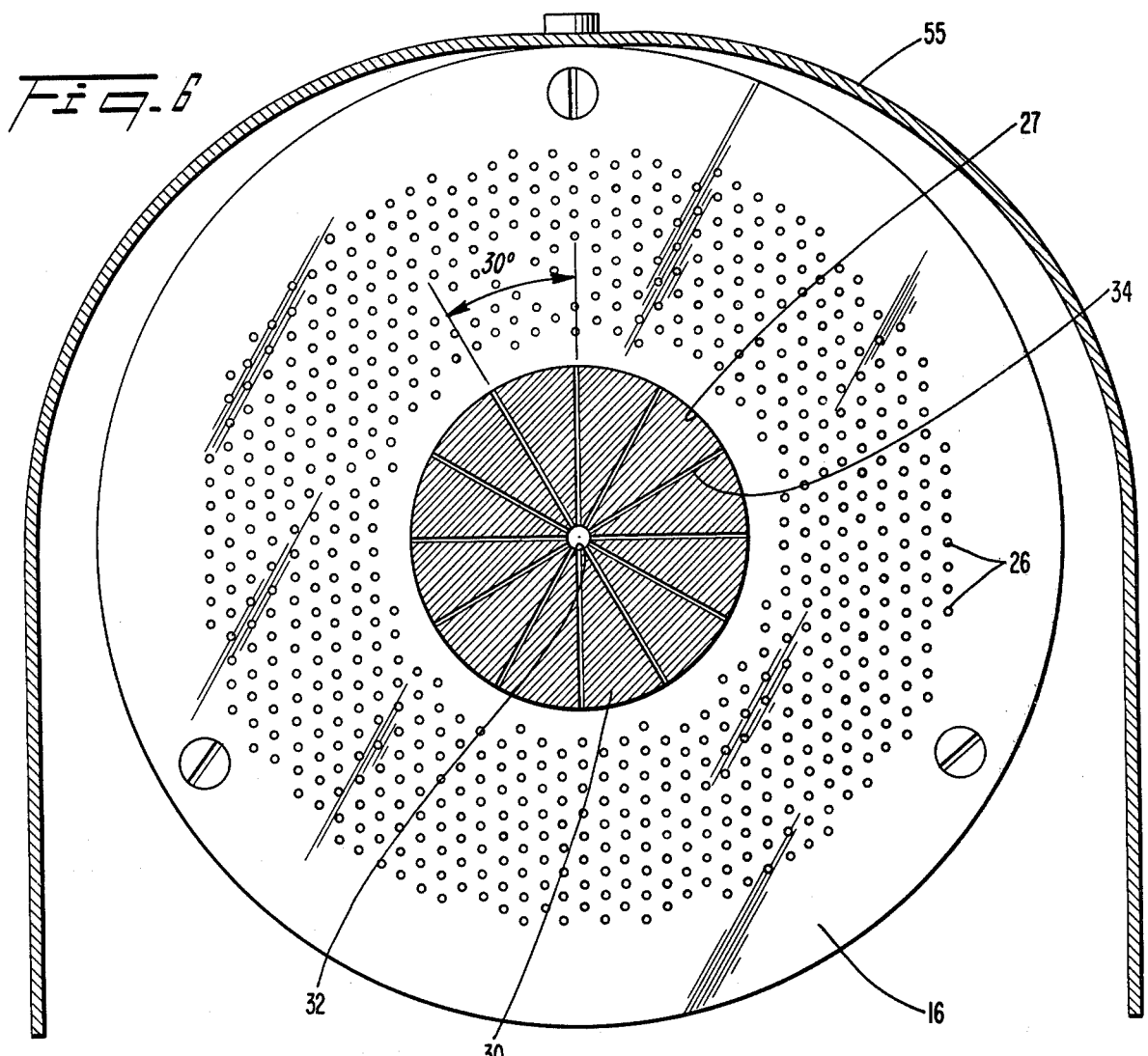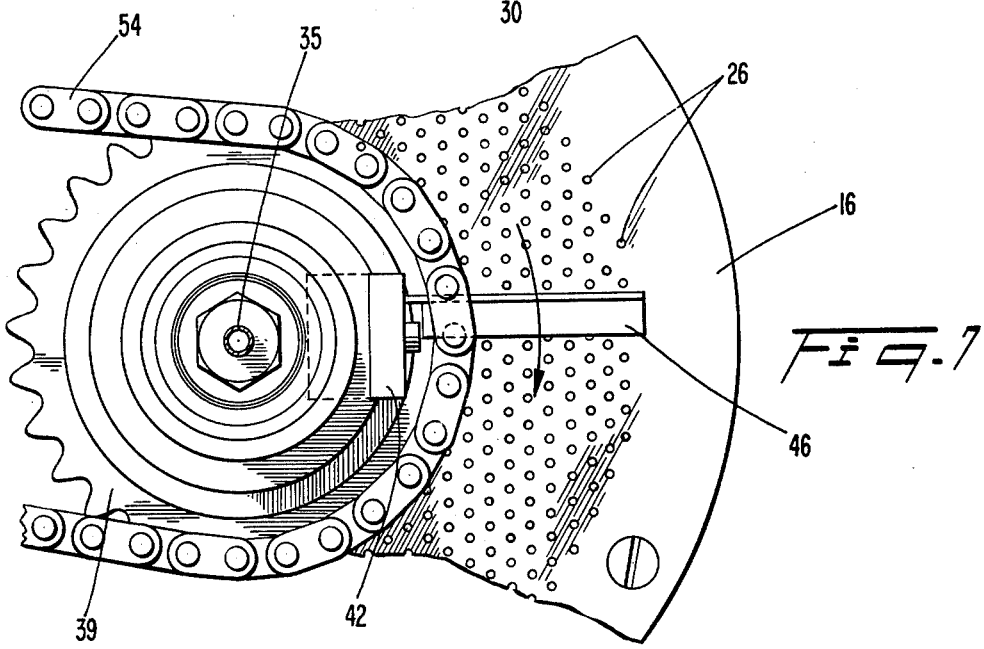

APPARATUS FOR PRODUCING A FLOW OF SHORT CHEESE STRANDS

BACKGROUND OF THE INVENTION

The present invnntion relates to apparatus for producing extruded topping particles for deposit on food products, and, more particularly to such apparatus for handling topping materials having a soft sticky consistency.

In the baking industry, manufacturing costs are reduced by providing automated systems which require a minimum labor force and which operate continuously at high production rates. Some materials are particularly difficult to handle in certain ways on an automated basis. In the past, satisfactory means have not been available for converting a mass of soft, sticky topping material, such as cheese, into discrete particles and then evenly distributing these particles over the surface of a bakery product.

SUMMARY OF THE INVENTION

It is the object of the present invention to provide apparatus for converting a mass of soft, sticky topping material into discrete particles.

Another object is to provide such apparatus in which the particles are evenly distributed over the surface of a bakery product.

The foregoing objects are generally accomplished by providing apparatus for case hardening extruding strands of the material with a flow of air and periodically severing the strands with a knife that moves within the airflow, the air impinging upon the strand pieces and moving them away from the knife as they are cut.

BRIEF DESCRIPTION OF THE DRAWINGS

A preferred embodiment of the invention has been chosen for the purpose of illustration and description, and is shown in the accompanying drawings, forming a part of the specification wherein:

FIG. 4 is an elevational view in logitudinal section taken along the line 4—4 in FIG. 3.

FIG. 5 is a top plan view of a portion of the apparatus shown in FIG. 4.

FIG. 6 is a sectional view taken along line 6—6 on FIG. 4.

FIG. 7 is a partial end view of apparatus shown in FIG. 4 with the knife blade in a different position.

FIG. 8 is a top plan view of a bakery product on which cheese topping has been deposited by the invention.

DESCRIPTION OF THE PREFERRED EMBODIMENT

Figure 1:
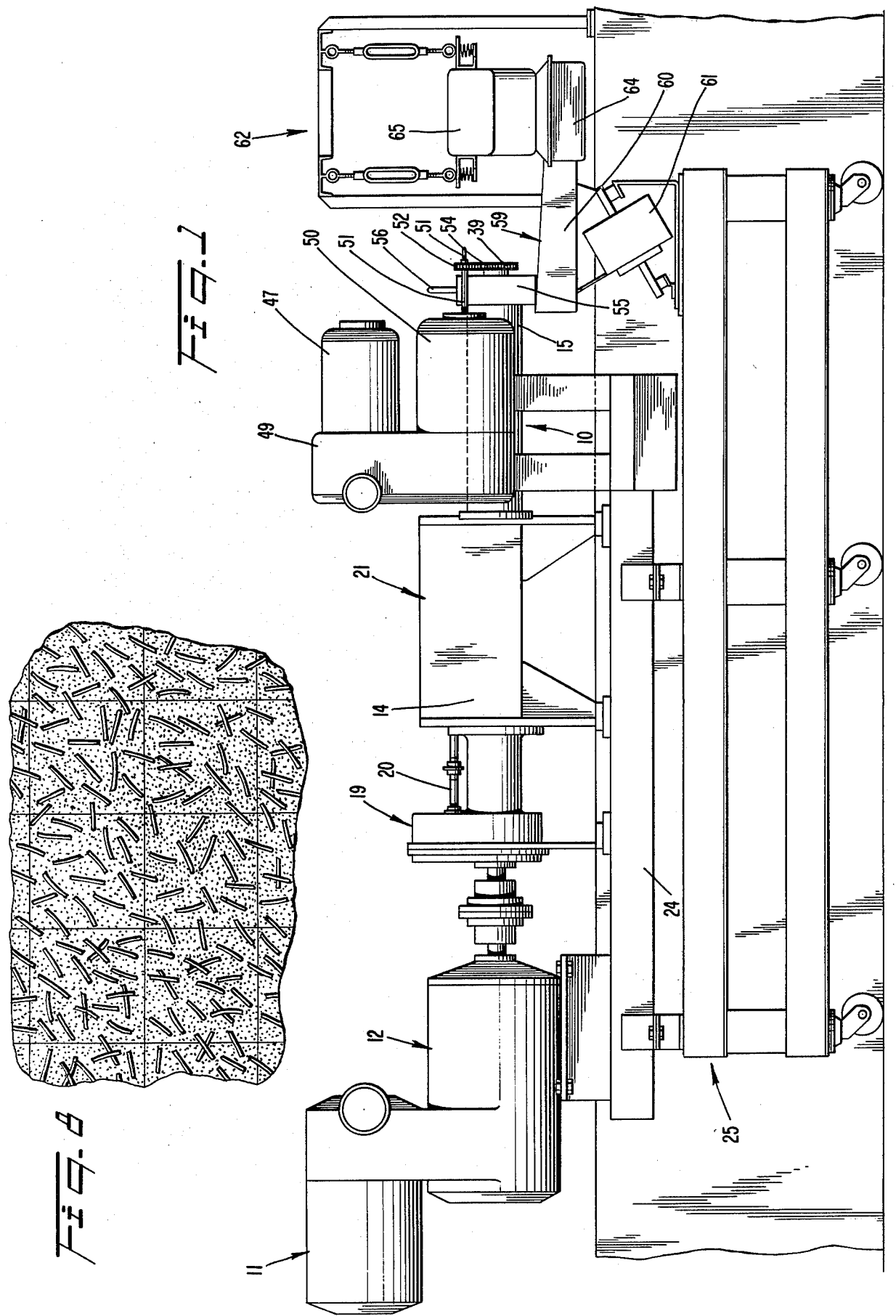
FIG. 1 is a front elevational view of apparatus including the present invention.

Referring now to the drawings in detail, there is shown apparatus which includes an extruder 10 driven by a motor 11 through a variable speed transmission 12. The extruder has an infeed section 14 and a barrel 15 on the end of which a die plate 16 is mounted. An extruding worm 17 runs longitudinally through the infeed section 14 and the barrel 15, and is driven by the motor 11 through a gear train 19 having a power take-off shaft 20. The extruder has a hopper 21 open at the top to receive chunks of cheese. A feeding worm screw 22 is positioned in the hopper above and to one side of the worm 17 to feed the cheese chunks down to the extruding worm 17. The feeding worm 22 is driven by the shaft 20.

The extruder 10, the motor 11, the transmission 12 and the gear train 19 are mounted on a platform 24 which is part of a wheeled carriage 25 that consists of a framework of structural members.

Also mounted on the platform 24 and on the die plate 16 are the parts of a mechanism for cutting cheese strands into pieces and directing the cut pieces onto a distributing conveyor system. Referring to FIGS. 4–7 in particular, the die plate 16 is formed with a plurality of die orifices 26 arranged in an annular band around a central aperature 27. Mounted to the die plate is a formation 29 which includes a cylindrical base 30 fitted into the aperature 27 and a shaft 31 extending outwardly from the base 30.

The base 30 extends outwardly past the face of the die plate 16. A bore 32 extends axially through the shaft 31 into the base 30. From the end of the bore 32, twelve fine passageways 34 extend radially outwardly to the circumferential surface of the base 30 which protrudes past the die plate 16. The passageways 34 are equally spaced from each other at an angle of 30 degrees. A source of air under pressure is connected to the bore 32 by means of a tubing 35 and a fitting 36 threaded into the end of the shaft 31. A bearing housing 37 carrying a sprocket wheel 39 and a knife assembly 40 is journalled on the end of the shaft 31 on a bearing 41. The knife assembly 40 includes a bracket 42 mounted to the housing 37 by machine screws, and a knife member 44 rivited to the bracket. The member 44 includes an "L" shaped arm 45 and a blade 46 positioned at an angle to the face of the die plate 16.

The portion of the cheese strand severing mechanism which is mounted on the platform 24 includes a motor 47, a gear train 49 and a variable speed drive 50. The variable speed drive 50 has an output shaft 51 on which a sprocket wheel 52 is mounted. A drive chain 54 extends between the sprocket wheel 52 and the sprocket wheel 39.

Figure 2:
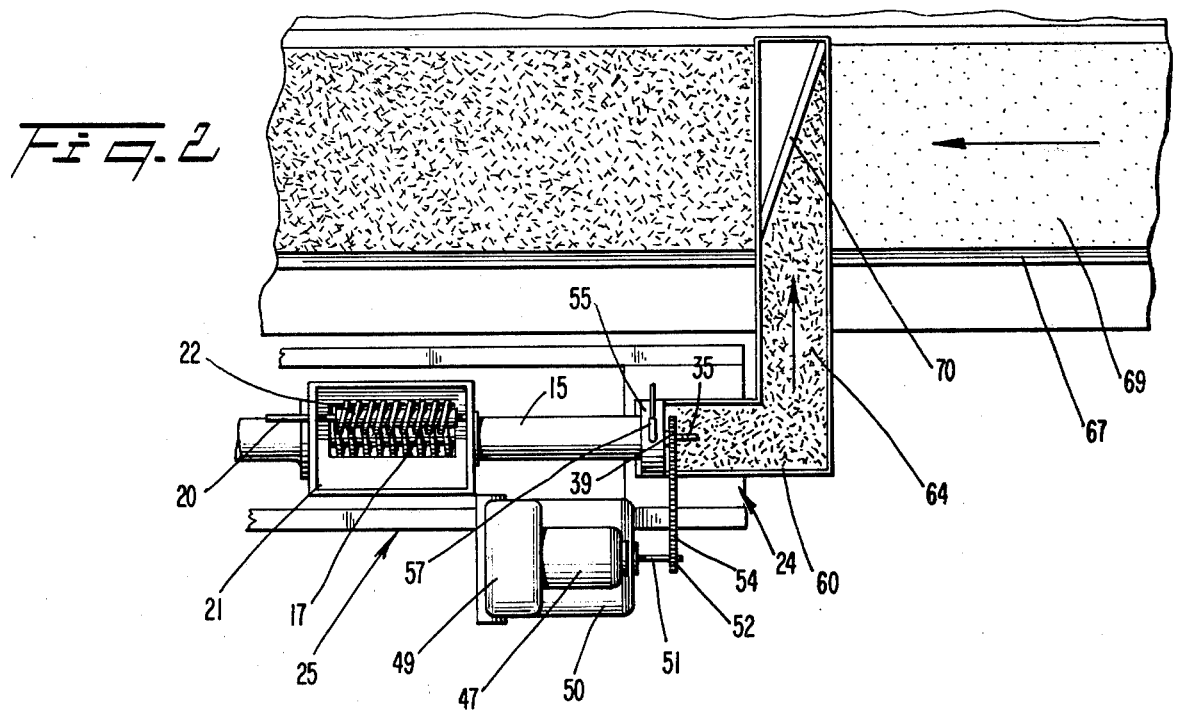
FIG. 2 is a top plan view of the portion of the apparatus embodying the invention.
Figure 3:
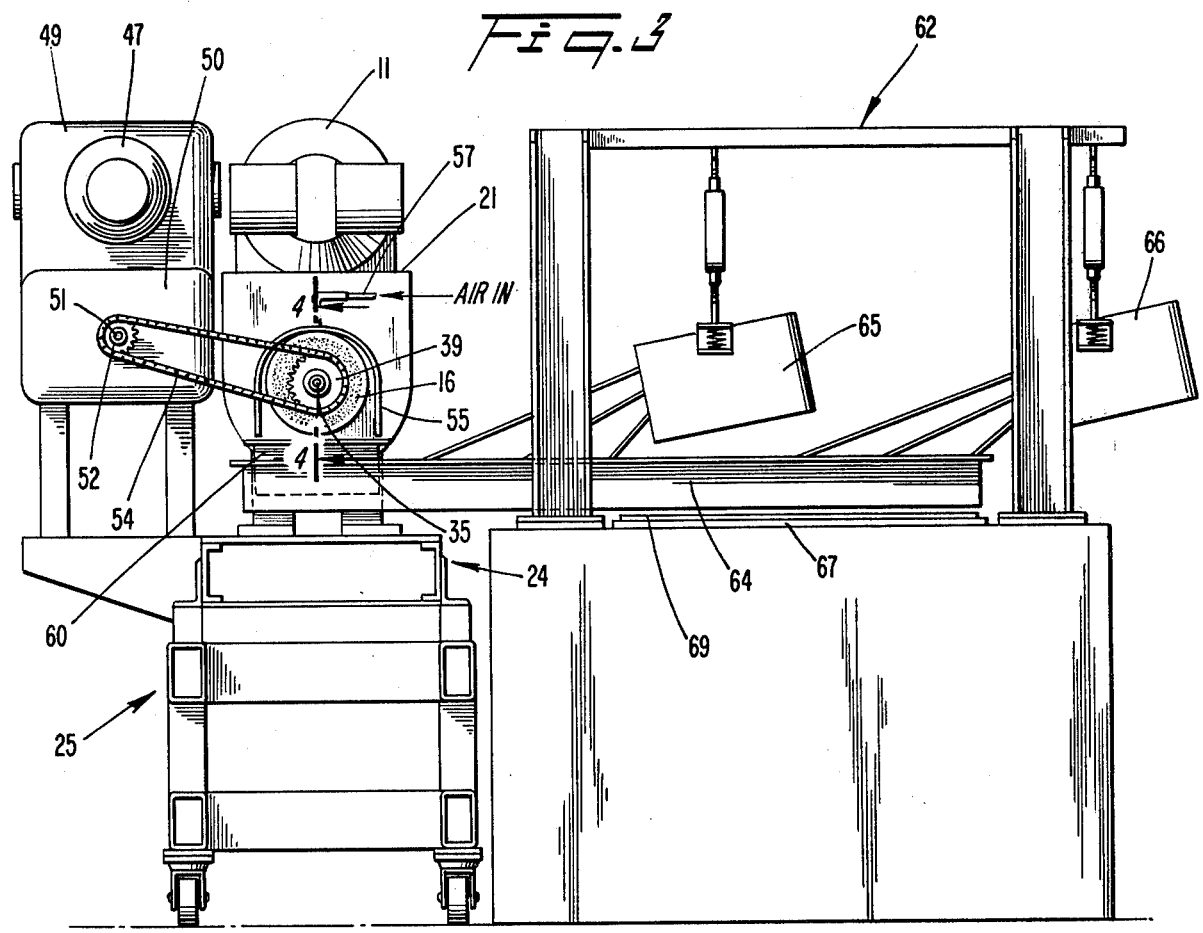
FIG. 3 is a right side elevational view of the apparatus.

As shown in FIGS. 2, 4 and 6, a downwardly facing "U" shaped shroud 55 is mounted on the end of the extruder barrel 15. A downwardly facing air nozzle 56 is positioned at the top of the shroud and is connected to a supply of air under pressure (not shown) by a hose 57.

A vibratory conveyor 59 including a "U" shaped tray 60 and a vibrating motor 61 coupled to the tray for causing the translation of articles along the tray. A second vibratory conveyor 62 is positioned to receive the output of the conveyor 59. The conveyor 62 includes a "U" shaped tray 64 and a pair of vibrating motors 65 and 66 for powering the conveyor.

As shown in FIG. 2 the tray 60 is cut at an angle at the output end thereof to distribute the material thereon across the entire width of the tray 64.

The end of the tray 64 extends across a conveyor belt 67 which carries a sheet of dough 69 that has been divided into individual pieces. The tray 64 is provided with a slot 70 extending at an angle from one edge of the dough sheet to the other. The cheese strand pieces on the tray 64 are evenly distributed across the dough sheet.

In operation, large pieces of cheese are manually placed in the hopper 21 of the extruder 10. The feed worm 22 draws the cheese down into the extruding worm 17 and strands of cheese are extruded through the die orifices 27 in the dieplate 16.

Air is introduced into the tube 35 and flows through the bore 32 into the radial passageways 34. The air sets issuing from the passageways 34 impinge upon and flow around the cheese strands extruding from the orifices 26. This air flow cools and dries the surface to provide a case hardening effect. The housing 37 is rotated on the formation 31 by the drive chain 54. The knife blade 46 moves in a circular path around the annular band of die orifices 26 to cut the strands at the face of the dieplate as shown in FIG. 5. As the strands are cut, the surface of the blade is placed in contact with the soft interior of the strand. Any strand pieces which tend to adhere to the blade are dislodged as the air blasts from the passageways 34 impinge upon the cut strand pieces.

The streams of air issuing from the top and side passageways 34 are redirected by the shroud 55 and the downward stream of air issuing from the nozzle 56 to deposit the strand pieces on the floor of the tray 60 in a relatively even distribution pattern.

The vibratory action of the conveyor 59 completes the even distribution of the strand pieces across the tray 60. The conveyor 59 deposits the strand pieces on the tray 64 of the conveyor 62 in uniform distribution pattern, and the conveyor 62 deposits the strand pieces uniformly onto the dough sheet (FIG. 8) through the slot 70.

The dough sheet is carried by the conveyor 67 into an oven (not shown) wherein the dough is baked at 325° F. for about 5 minutes. During the baking, the cheese strands retain their shape but become fused to the surface of the baked dough.

It will be seen from the foregoing that the present invention provides apparatus for converting a mass of soft, sticky topping material into discrete particles and evenly distributing the particles over the surface of a bakery product.

I claim:

1. Apparatus for producing a continuous flow of short strands of cheese comprising in combination an extruder having a dieplate formed with a plurality of die aperatures arranged in an annular band for extruding cheese in a plurality of individual strands, a formation positioned centrally with respect to said dieplate and extending away from said extruder, said formation being provided with a plurality of air nozzles spaced about the periphery thereof, each nozzle being directed outwardly adjacent to said dieplate and across said band of aperatures, air passageway means extending through said formation to said nozzles, means for connecting a source of pressurized air to said passageway means whereby air streams issue from said nozzles to case harden the cheese strands, a knife member, means for mounting said knife member in contact with said dieplate for movement along said annular band to periodically sever said cheese strands to produce short strand pieces, conveyor means positioned beneath said extruder to catch said pieces, and means for directing said pieces downwardly toward said conveyor including a downwardly facing hood positioned at the end of said extruder and a downwardly directed air nozzle mounted in the top of said hood.

2. Apparatus according to claim 1 wherein said knife member includes a blade portion for severing said strands and wherein said air nozzles on said formation are positioned so that the moving knife blade sequentially passes through the air stream issuing from said formation nozzles, the severed strand pieces being thereby dislodged from said knife blade.

3. Apparatus according to claim 2 wherein said formation is generally cylindrical, and said means for mounting said knife member includes a bearing mounted concentrically on said formation, drive means mounted on said bearing, and a knife member mounting member mounted on said bearing.

4. Apparatus according to claim 3 wherein said formation nozzles are directed radially with respect to said annular band and are angularly displaced from each other by about 30 degrees.

5. Apparatus according to claim 4 wherein said knife blade extends radially across said annular band.

6. Apparatus according to claim 5 wherein said conveyor is a vibratory conveyor.

7. Apparatus according to claim 5 wherein said drive means mounted on said bearing is a first sprocket wheel.

8. Apparatus according to claim 7 including knife driving motor means, a second sprocket wheel on said motor means, and a drive chain interconnecting said first and second sprocket wheels.

9. Apparatus according to claim 5 wherein said hood extends from said dieplate a distance less than the distance from the dieplate to said drive means mounted on said bearing.

* * * * *